United States Patent
Shiina et al.

[11] Patent Number: 5,477,298
[45] Date of Patent: Dec. 19, 1995

[54] CAMERA

[75] Inventors: Michihiro Shiina; Jun'ichi Iwamoto; Fumio Iwai, all of Oomiya, Japan

[73] Assignee: Fuji Photo Optical Co. Ltd., Saitama, Japan

[21] Appl. No.: 241,968

[22] Filed: May 12, 1994

[30] Foreign Application Priority Data

May 14, 1993 [JP] Japan ................................. 5-113431

[51] Int. Cl.⁶ ................................................... G03B 3/10
[52] U.S. Cl. ................................................ 354/195.12
[58] Field of Search ........................... 354/195.1, 195.12; 359/432

[56] References Cited

U.S. PATENT DOCUMENTS 5,028,945  9/1990  Kashihara et al. .
5,241,335  8/1993  McIntyre .
5,298,933  3/1994  Chigira .
5,341,190  8/1994  Ogawa .

Primary Examiner—Michael L. Gellner
Assistant Examiner—Daniel G. Chapik
Attorney, Agent, or Firm—Hickman & Beyer

[57] ABSTRACT

A camera having a zoom system which comprises a front lens group driven by a DC motor and a rear lens group driven by a stepping motor includes a motor control apparatus for controlling the DC motor and the stepping motor. The motor control apparatus voltage measuring means for measuring a voltage of a power source for driving the DC motor and the stepping motor, decision means for deciding as to whether the voltage is more than a predetermined value, means for simultaneously driving the DC motor and the stepping motor, if a decision is made that the voltage is more than the predetermined value, and means for driving only the DC motor and thereafter driving only the stepping motor, if the voltage is not more than the predetermined value.

58 Claims, 14 Drawing Sheets

CAMERA

BACKGROUND OF THE INVENTION

1. Field of the Invention

The present invention relates to a camera having a two lens group zoom system composed of a front lens group and a rear lens group and, more particularly, to an apparatus and method for controlling motors for driving the lens groups.

2. Related Background Art

A recent demand is to reduce the outer dimensions of camera, particularly of compact camera. Especially, an important subject is to miniaturize a lens barrel as much as possible. To miniaturize the lens barrel, a recent trend in camera having the two lens group zoom system is to replace a mechanical cam system with a mechanism for driving the front lens group and the rear lens group by separate motors.

In such a motor driven mechanism, a direct current motor is employed as the motor for driving the front lens group and a stepping motor as the motor for driving the rear lens group. Also, a drive method of the motors is generally the so-called simultaneous drive method in which the stepping motor is driven in several pulses during continuous drive of the direct current motor.

The simultaneous drive method of the front and rear lens group driving motors could have, however, an error operation of the motors, if the battery is exhausted so as to lower the drive voltage for motors. In particular, in case of the stepping motor, a rotational shaft could not be rotated, when a drive voltage is below a certain value. Since a position of rear lens group is detected from the total number of pulses output from CPU to the stepping motor, a failure in drive of stepping motor would result in a deviation between an actual position and the position of rear lens group obtained from the pulse number. This so-called step-out state is an especially significant problem to be solved, because recent cameras tend to employ a smaller battery with lower voltage, specifically changing from 6 V type to 3 V type, with a decrease in size of camera.

Consequently, a need exists for a way to accurately locate the front lens group and the rear lens group at desired positions even with a decrease in drive voltage.

SUMMARY OF THE INVENTION

According to one aspect of the present invention there is provided a camera designed to satisfy the aforementioned needs. The camera comprises: a camera body; a front lens group arranged as movable backward and forward relative to the camera body; a rear lens group disposed between the camera body and the front lens group as movable backward and forward relative to the camera body; a front lens group driving motor for driving the front lens group; a rear lens group driving motor for driving the rear lens group; a zoom switch; and a motor control apparatus for controlling the front lens group driving motor and the rear lens group driving motor, wherein when the zoom switch is on, if a voltage of a power source for driving the front lens group driving motor and the rear lens group driving motor is more than a predetermined value, the motor control apparatus simultaneously drives the front lens group driving motor and the rear lens group driving motor, whereas if the voltage is not more than the predetermined value, the motor control apparatus drives only the front lens group driving motor and thereafter drives only the rear lens group driving motor.

Also, according to another aspect of the present invention, there is provided a camera comprising a camera body; a front lens group arranged as movable backward and forward relative to the camera body; a rear lens group disposed between the camera body and the front lens group as movable backward and forward relative to the camera body; a front lens group driving motor for driving the front lens group; a rear lens group driving motor for driving the rear lens group; a zoom switch; and a motor control apparatus for controlling the front lens group driving motor and the rear lens group driving motor, wherein when the zoom switch is on, if a voltage of a power source for driving the front lens group driving motor and the rear lens group driving motor is more than a predetermined value, the motor control apparatus simultaneously drives the front lens group driving motor and the rear lens group driving motor, whereas if the voltage is not more than the predetermined value, the motor control apparatus alternately drives the front lens group driving motor and the rear lens group driving motor by respective predetermined amounts.

As described above, the present invention employs such an arrangement that if the voltage of power source is lowered, the simultaneous drive of motors is suspended and the front lens group driving motor and the rear lens group driving motor each are singly driven, whereby each motor can be normally driven. Especially, in case a stepping motor is employed as the rear lens group driving motor, such an arrangement can prevent occurrence of step-out due to the voltage decrease, whereby the lens groups can be accurately located at desired positions.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the course of the following detailed description, reference will be made to the attached drawings in which.

DETAILED DESCRIPTION OF THE PREFERRED EMBODIMENT

Figure 1A:
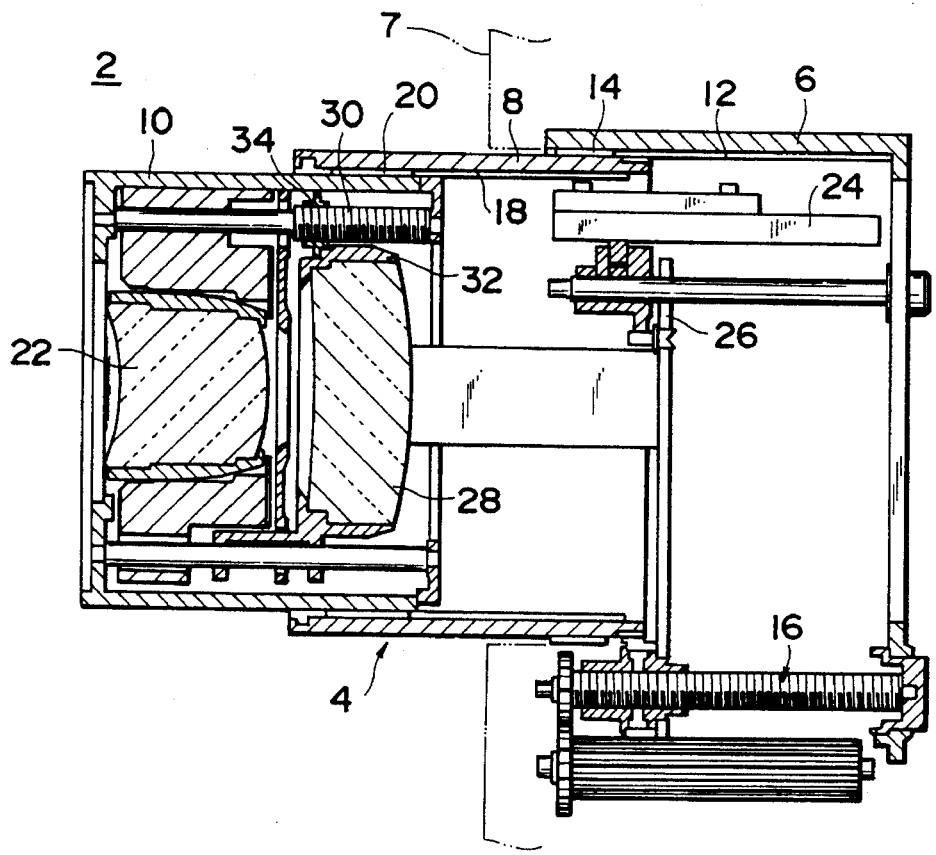
FIG. 1A is a cross sectional view to show the structure of a two lens group zoom system in a camera to which the present invention is applied, showing a state of telephoto extreme.
Figure 1B:
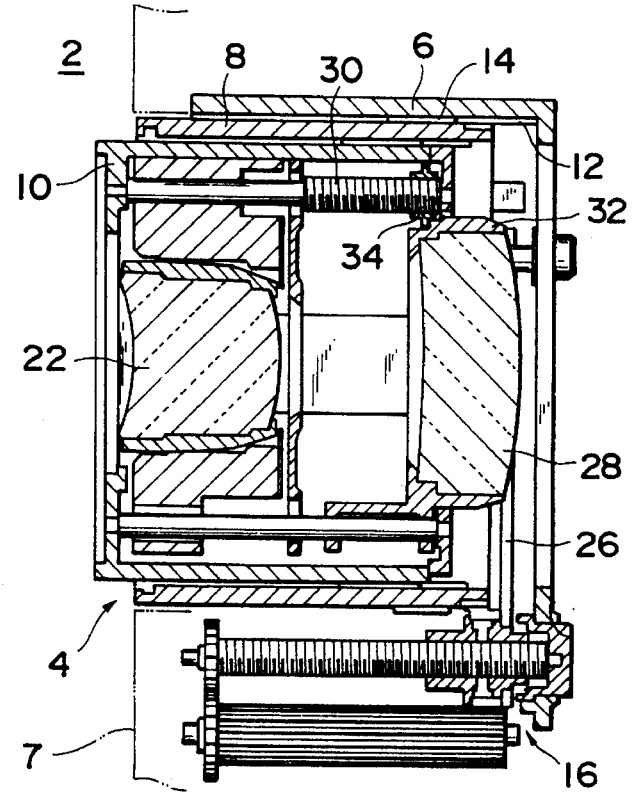
FIG. 1B is a view similar to FIG. 1A, showing a state of wide-angle extreme.

Referring now to the drawings, and particularly, to FIGS. 1A and 1B, there are shown cross sectional views of the structure of a two lens group zoom system 2 in a camera to which the present invention is applied. A lens barrel 4 in the zoom system 2 is composed of a stationary barrel 6 fixed to a camera body 7, an intermediate barrel 8 telescopically stored in the stationary barrel 6, and a moving barrel 10 telescopically stored in the intermediate barrel 8.

A spiral groove 12 is formed on the internal surface of the stationary barrel 6, and an engaging portion 14 provided on the outer surface of end portion of the intermediate barrel 8 is meshed with the spiral groove 12. The intermediate barrel 8 is arranged as rotatable in normal and reverse directions by a direct current (DC) motor (not shown in FIGS. 1A and 1B) through a transmission mechanism 16, so that it can extend and contract relative to the stationary barrel 6 with its rotation.

A spiral groove 18 is also formed on the internal surface of the intermediate barrel 8, and an engaging portion 20 on the outer surface of end portion of the moving barrel 10 is meshed with the spiral groove 18. The moving barrel 10 is arranged as incapable of rotating relative to the stationary barrel 6, so that it telescopically moves in the same direction as the telescopic motion of the intermediate barrel 8 when the intermediate barrel 8 is rotated.

A front lens group (FLG) 22 which consists of one or more lenses is constructed of is fixed in a front end portion of the moving barrel 10. Accordingly, the front lens group 22 is moved backward and forward when drive of the DC motor is controlled to telescopically move the intermediate barrel 8 and the moving barrel 10. Thus, the DC motor functions as a driving motor of the front lens group 22. Numeral 24 designates a position sensor, which detects a position of a moving member 26 moving together with the intermediate barrel 8. Since a position of the front lens group 22 is uniquely determined by the position of the intermediate barrel 8, the position of the front lens group 22 can be detected from an output signal from the position sensor 24 whenever necessary.

A rear lens group (RLG) 28 which consists of one or more lenses is arranged behind the front lens group 22 (on the camera body side) within the moving barrel 10 so as to be movable backward and forward. Although not shown in FIGS. 1A and 1B, a two-phase stepping motor is set as the rear lens group driving motor inside the moving barrel 10, and a female screw member 34 integral with a lens frame 32 for the rear lens group 28 is in mesh with a feed screw 30 connected to a rotation shaft of the stepping motor. Accordingly, the rear lens group 28 moves backward and forward by controlling the drive of stepping motor.

The rear lens group 28 is provided with a home position sensor (not shown in FIGS. 1A and 1B) for detecting if it is located at a reference position as defined relative to the moving barrel 10. The position of the rear lens group 28 is calculated from the number of pulses of the stepping motor driven from the reference position.

Figure 2:
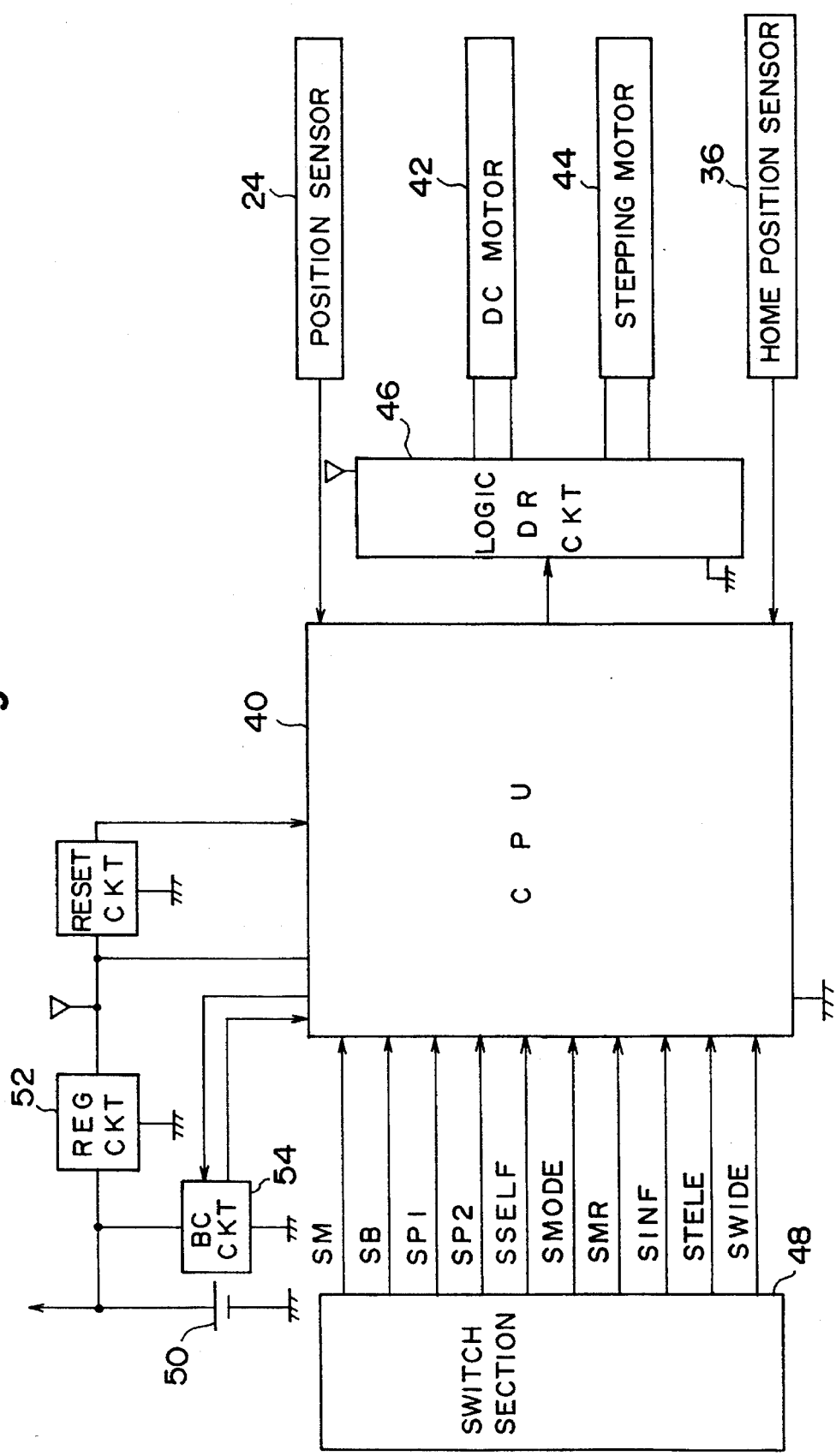
FIG. 2 is a block diagram to show a one-chip type microcomputer or CPU constituting a lens driving motor control apparatus according to the present invention.
Figure 3A:
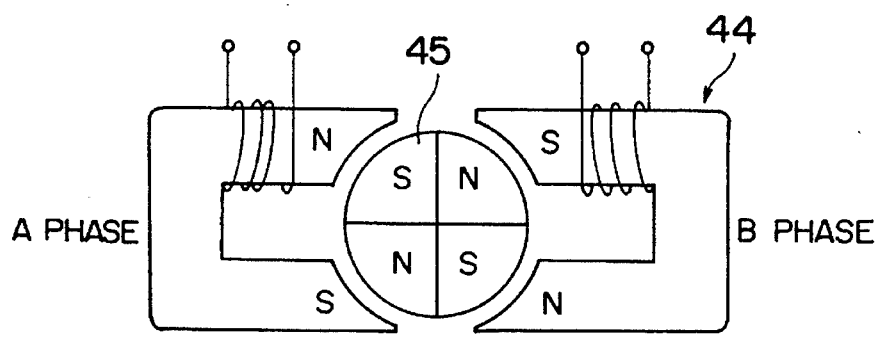
FIGS. 3A to 3D are conceptual drawings to show the structure and operation of a stepping motor for driving a rear lens group in the zoom system, respectively.
Figure 3B:
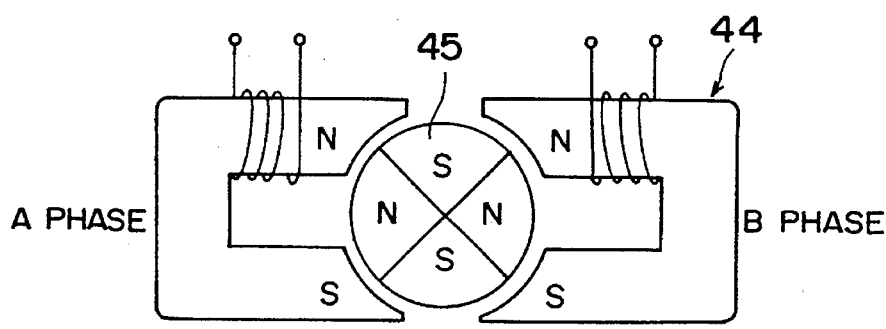
Figure 3C:
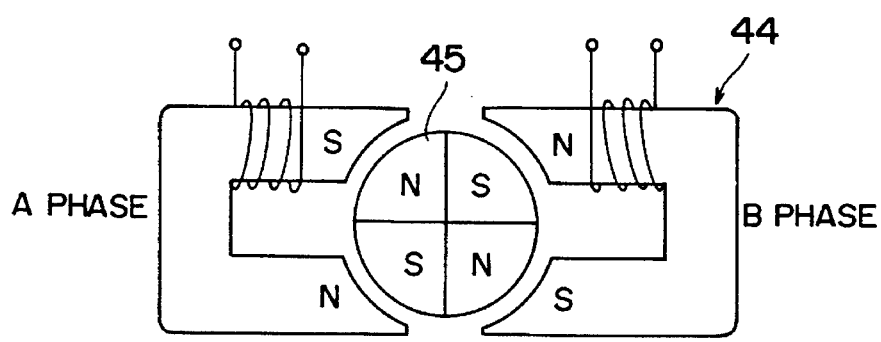
Figure 3D:
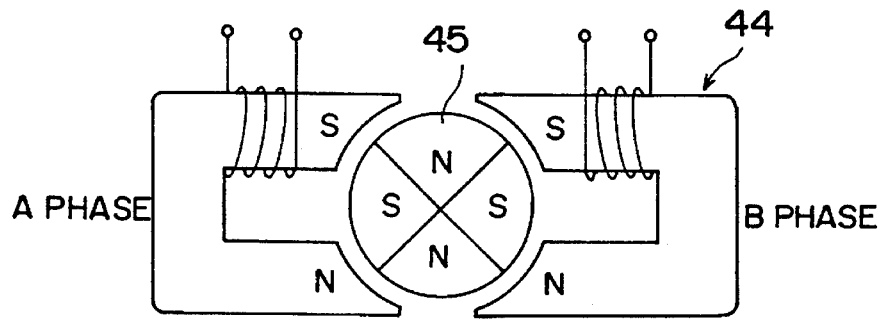

A lens driving motor control apparatus according to the present invention, for controlling the drive of the DC motor and the stepping motor, is mainly constructed with a one-chip type microcomputer (referred to as "CPU" in this specification and the attached drawings) 40, as shown in FIG. 2. The DC motor 42 and the stepping motor 44 are connected to CPU 40 through a logic driver circuit 46. The logic driver circuit 46 can control rotation and brake of motor 42 by properly applying a high voltage or a low voltage to the DC motor 42 in accordance with a signal from CPU 40. Also, CPU 40 generates pulse signals to the stepping motor 44 in accordance with an energization pattern as shown in the below table, so that A phase and B phase of stepping motor 44 can be suitably energized.

In the below table, a rear lens group pointer (RLG pointer) is RAM data, and CPU 40 energizes the phases of stepping motor 44 in an energization pattern depending upon a value of RLG pointer to move the rear lens group 28 to a next phase. FIG. 3 is a conceptual drawing to show the structure and operation of stepping motor 44 used in the camera in the present embodiment. In FIGS. 3A to 3D show states of RLG pointers "0" to "3", respectively. As seen from FIGS. 3A to 3D, if pulse signals are output in such a cyclic pattern that the value of RLG pointer increases point by point from "0" to "3" and again returns to "0", a rotator 45 of stepping motor 44 normally rotates to move the rear lens group 28 backward, i.e., in the direction to leave the front lens group 22. Also, with pulse signals in such a cyclic pattern that the value of RLG pointer decreases point by point from "3" to "0" and again returns to "3", the stepping motor 44 is reversely rotated to move the rear lens group 28 forward. The states in FIGS. 3A and 3C each are called as "static stable position", where the rotator 45 is kept in a stable condition even upon stop of energization and will never rotate as long as no external force is applied. On the other hand, the states in FIGS. 3B and 3D each are called as "dynamic stable position", because the rotator 45 will rotate to either position in FIG. 3A or in FIG. 3C upon stop of energization.

TABLE 1

| RLG Pointer | Stepping Motor | |
|---|---|---|
| | A Phase | B Phase |
| 0 | Normal | Normal |
| 1 | Normal | Reverse |
| 2 | Reverse | Reverse |

TABLE 1-continued

| RLG Pointer | Stepping Motor | |
| --- | --- | --- |
| | A Phase | B Phase |
| 3 | Reverse | Normal |

A switch section 48 is connected to CPU 40. The switch section 48 includes a main switch (SM), a back lid switch (SB), release switches (SP1, SP2) interlocked with a shutter button, a self timer switch (SSELF), a strobe mode switch (SMODE), a forcible rewind switch (SMR), an INF switch (SINF) for shooting of distant view, a zoom switch (STELE) for zooming to the telephoto side, a zoom switch (SWIDE) for zooming to the wide-angle side, etc., on/off signals of which are supplied to CPU 40.

Further, a battery 50 is connected to CPU 40 through a regulator circuit (REG circuit) 52. The battery 50 also functions as a drive power source for DC motor 42 and stepping motor 44, and a voltage of battery 50 is in an equivalent relation with a drive voltage of each of DC motor 42 and stepping motor 44. Also, a battery check circuit (BC circuit) 54 is connected to the battery 50 to perform battery check, for example to check a voltage of battery 50, by a control signal from CPU 40 and to supply information of the check to CPU 40.

Yet further, connected to CPU 40 are a position sensor 24 for detecting the position of the front lens group 22 and a home position sensor 36 for detecting the reference position of rear lens group 28.

Next described in accordance with FIG. 4 to FIG. 8 are processes executed in the camera having CPU 40 in the above arrangement.

Figure 4:
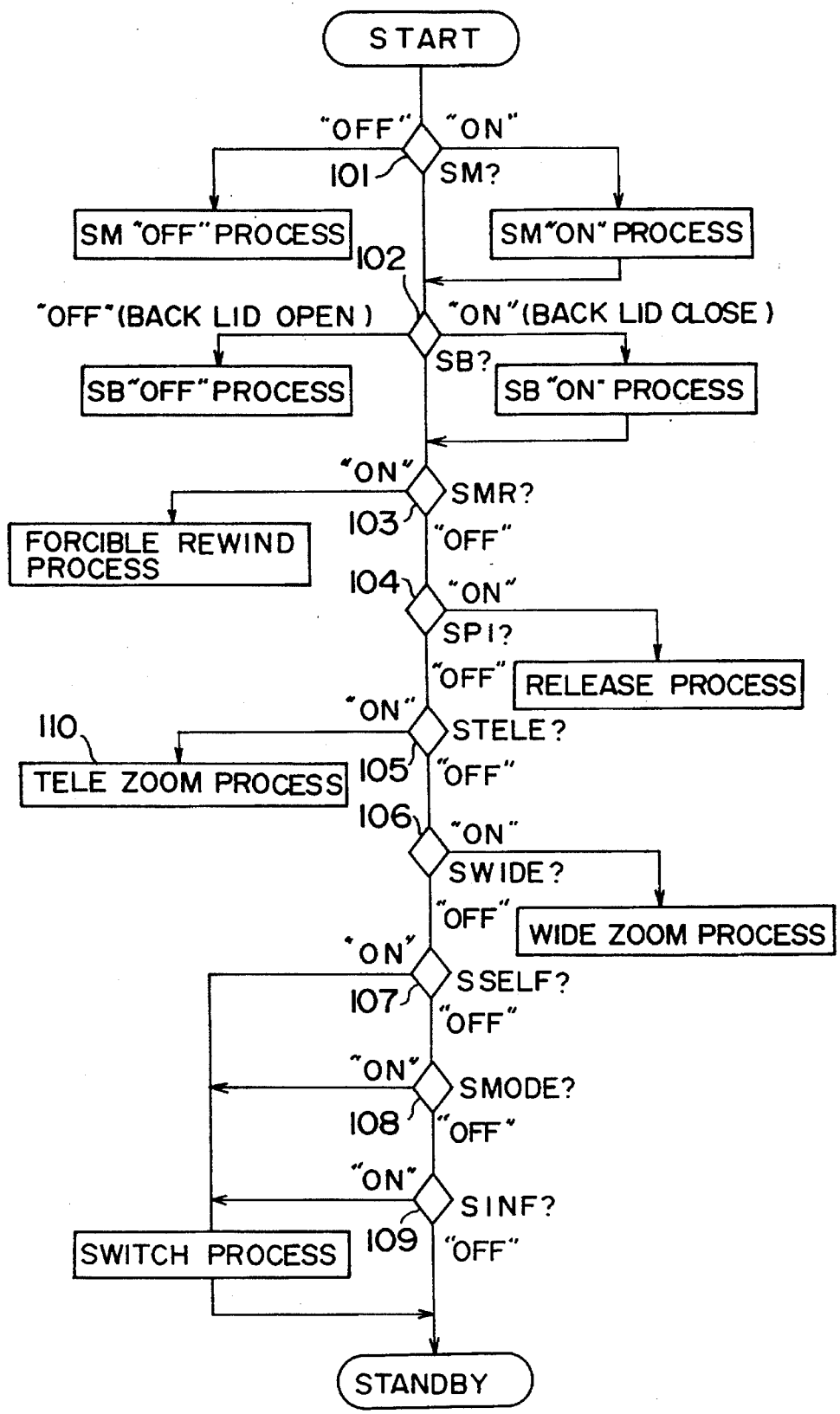
FIG. 4 is a flowchart to show an embodiment of processes before the camera reaches the standby state.

First, FIG. 4 is a flowchart from loading of film into the camera to a standby state. Namely, sequential decisions are made as to if the main switch (SM) is turned on (Step 101), if the back lid switch (SB) is turned on after the back lid is closed (Step 102), if the forcible rewind switch (SMR) is off (Step 103), if the shutter button is not pressed while keeping the release switch ( SP1 ) off ( Step 104 ), if the telephoto zoom switch (STELE) is kept off (Step 105), if the wide-angle zoom switch ( SWIDE ) is kept off ( Step 106 ), the self timer switch (SSELF) is off (Step 107), if the strobe mode switch (SMODE) is off (Step 108), and if the INF switch (SINF) is off (Step 109). If the above conditions all are satisfied, the camera goes into a standby state. Once the camera goes into the standby state, Step 101 to Step 109 are repeated.

Figure 5A:
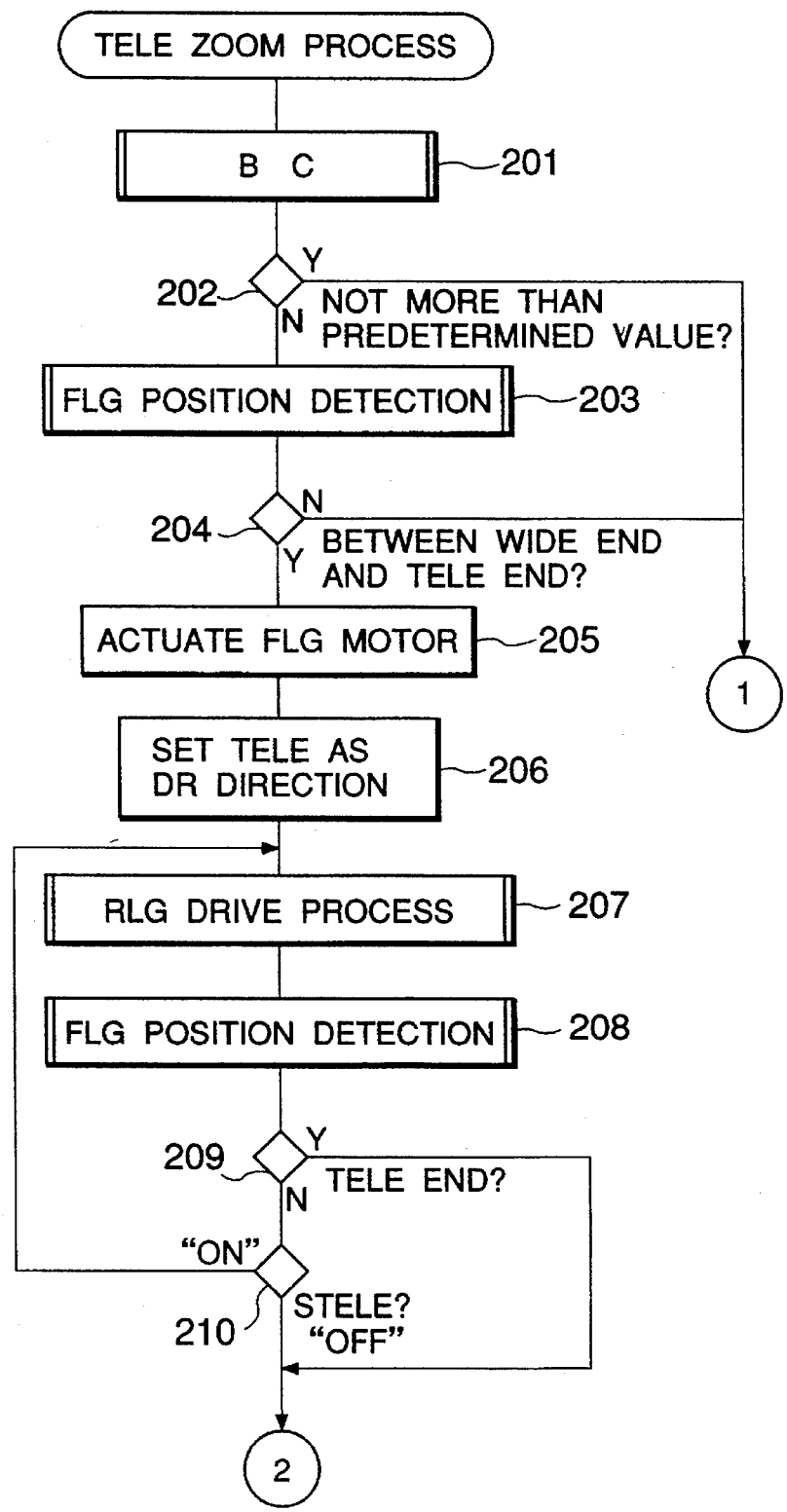
FIGS. 5A and 5B are flowcharts to show an embodiment of telephoto zoom process executed by the lens driving motor control apparatus according to the present invention.
Figure 5B:
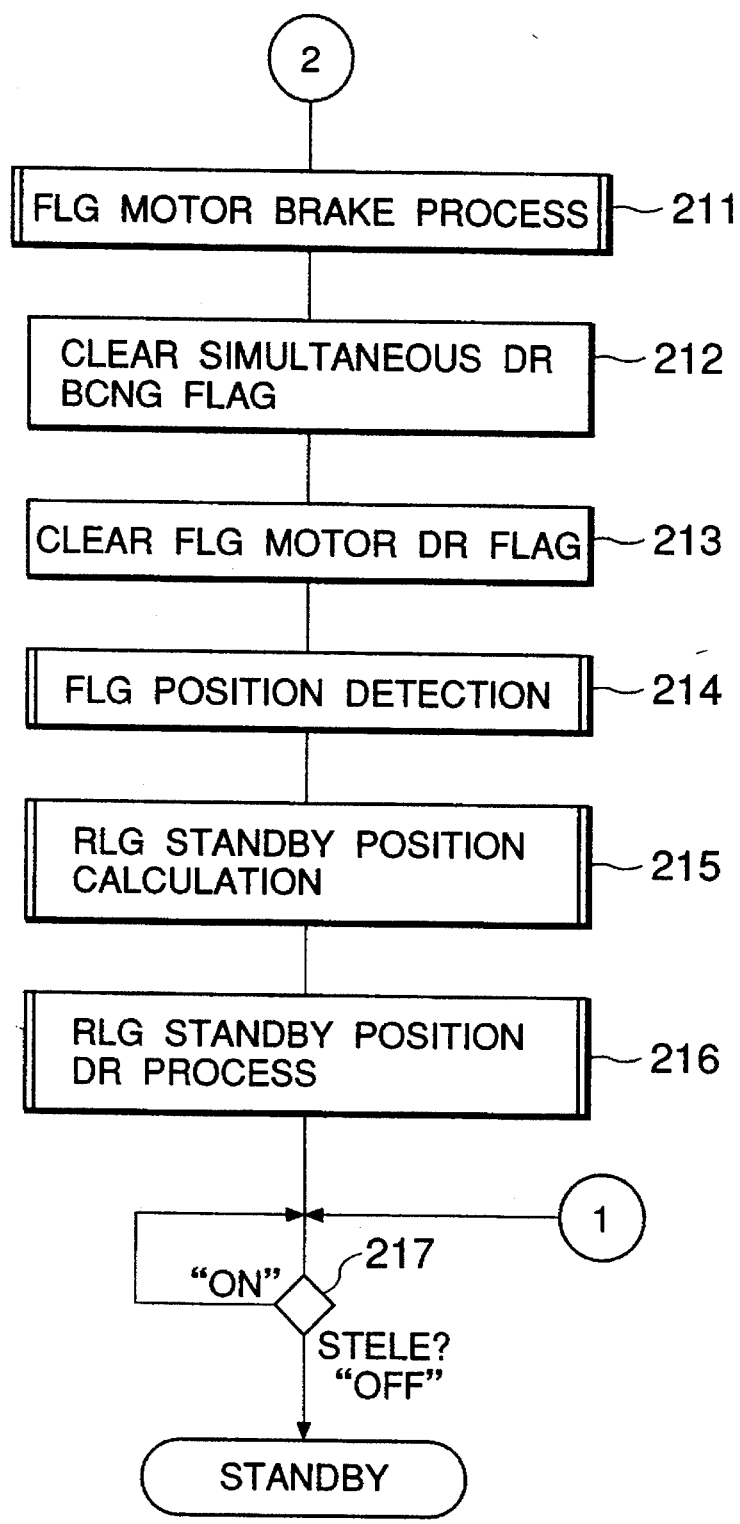

After the camera goes into the standby state as described and if the telephoto zoom switch (STELE) is pressed, a telephoto zoom process as detailed in FIGS. 5A and 5B is executed (Step 110).

In the telephoto zoom process, a battery check (BC) process is first carried out to measure a voltage of the battery (Step 201) and a decision is made as to whether the voltage is not more than a predetermined value (Step 202). If the voltage is not more than the predetermined value, the flow proceeds to Step 217 to wait until the telephoto zoom switch (STELE) is turned off. Then, after the telephoto zoom switch is turned off, this process is finished.

If the voltage of battery 50 is higher than the predetermined value, that is, if a decision is made that the voltage is within a normal range, a position of the front lens group 22 is detected according to a signal from the position sensor 24 (Step 203). If a decision at Step 204 is that the position of the front lens group 22 is out of the range of from the wide-angle (WIDE) end inclusive to the telephoto (TELE) end, the flow proceeds to Step 217 to end the process under an assumption that a further zooming operation cannot be conducted. In more detail, if the front lens group 22 is positioned at the TELE end (in the state shown in FIG. 1A in which the lens barrel 4 is most extended), further zooming cannot be possible on the telephoto side. Also, if the front group lens is located closer to the camera body than the WIDE end (in the state shown in FIG. 1B in which the lens barrel 4 is most contracted in the standby state) though the camera is in the standby state, it is considered that there is something abnormal, and the flow proceeds to Step 217.

If the front lens group 22 is located between the WIDE end and TELE end, the front lens group driving DC motor (FLG motor) 42 is driven to move the front group lens 22 in the telephoto direction, that is, forward (Step 205). Then, the telephoto direction (TELE) is set as the driving direction (Step 206).

After that, a drive process of the rear lens group driving stepping motor 44 (RLG drive process) and a position detection of the front lens group 22 (FLG position detection) are repeated until the telephoto zoom switch (STELE) is turned off or until the front lens group 22 reaches the TELE end (Steps 207 to 210). During these steps, the front lens group driving DC motor 42 is continuously driven.

Figure 6:
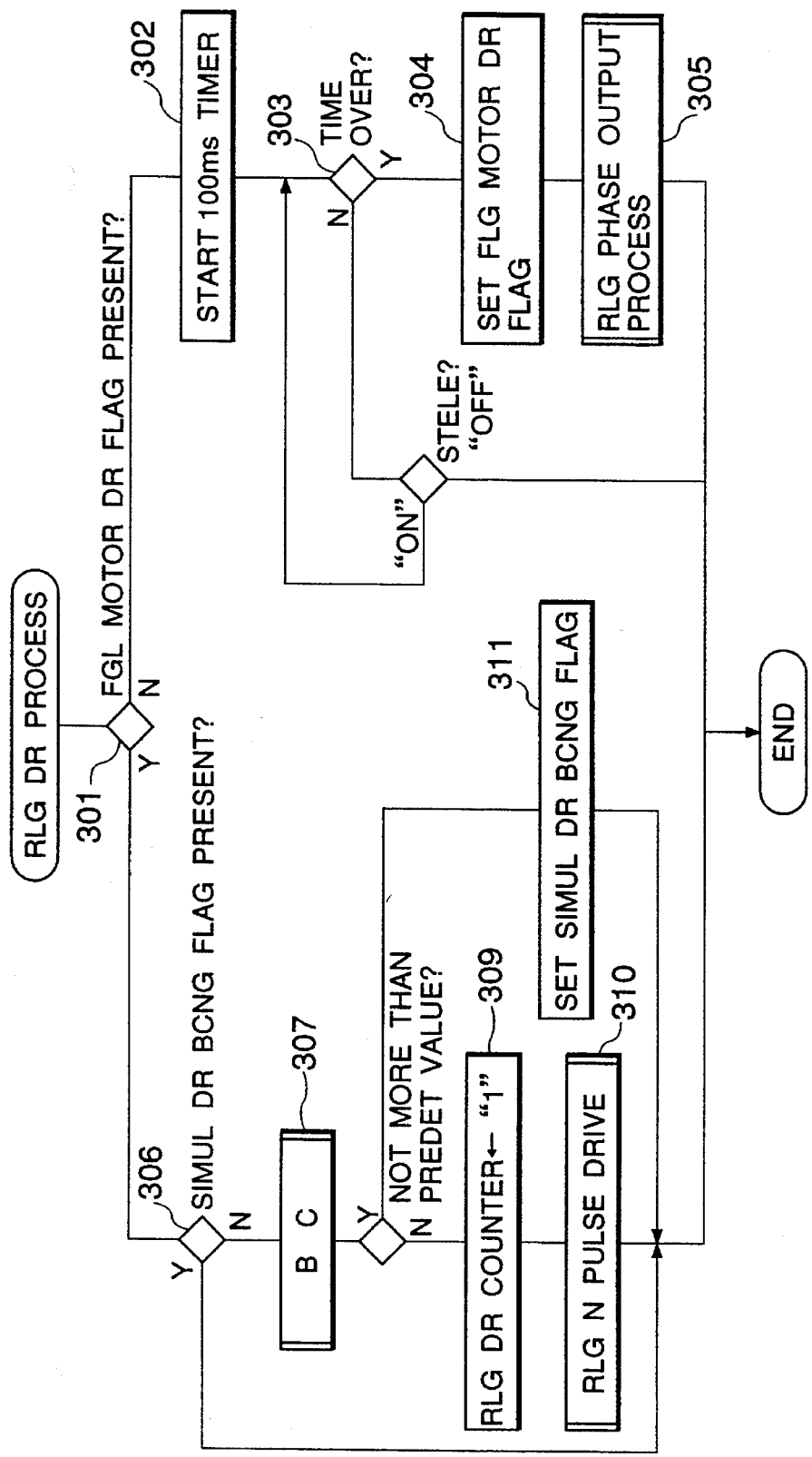
FIG. 6 is a flowchart to show an embodiment of RLG drive process executed by the lens driving motor control apparatus according to the present invention.

Here, the RLG drive process is described along the flowchart in FIG. 6.

First, immediately after drive start of DC motor 42, the flow goes from Step 301 to Step 302 to start a timer and then to set an FLG motor drive flag after a constant time (10 ms in this embodiment) elapses (Steps 303 and 304). Then an RLG phase output process is executed to take the stepping motor 44 to a phase according to a value of RLG pointer written in RAM (Step 305).

Figure 7:
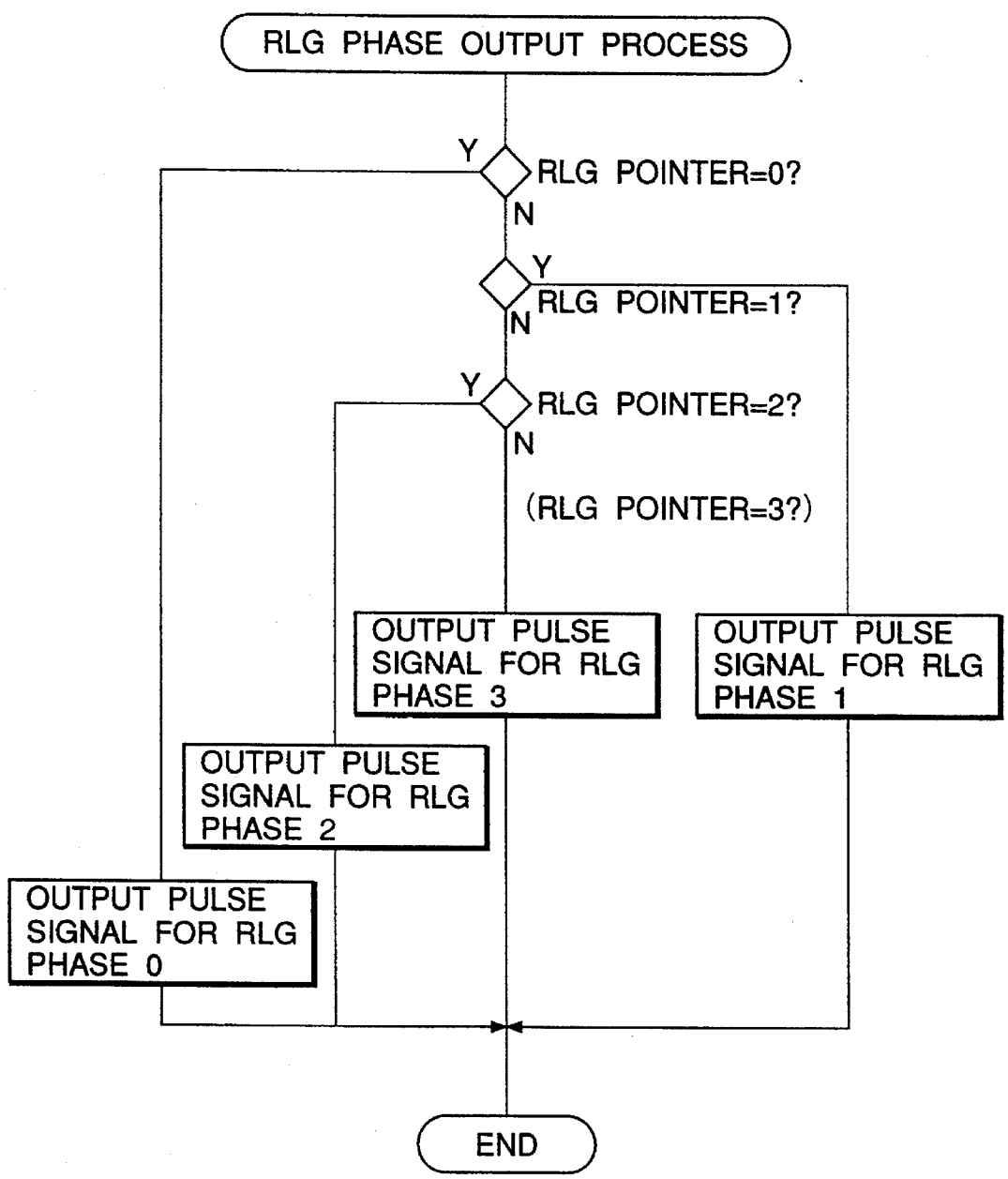
FIG. 7 is a flowchart to show an embodiment of RLG phase output process executed by the lens driving motor control apparatus according to the present invention.

In the RLG phase output process, as shown in FIG. 7, a predetermined pulse signal is output to suitably energize the phases of stepping motor 44, in order to achieve the phase of stepping motor 44 according to the value of RLG pointer (see FIGS. 3A to 3D).

Subsequently, the position detection of the front lens group 22 is executed (Step 208) and the RLG drive process is again conducted (Step 207). This time, the FLG motor drive flag is already set, and thus the flow goes from Step 301 to Steps 306 and 307 to carry out a battery check (BC) process. If a decision at Step 308 is that the voltage of battery 50 measured in this process is higher than the predetermined value, the drive voltage of stepping motor 44 is determined as normal, and then Steps 309 and 310 are executed.

Step 310 is a process for driving the stepping motor 44 by N pulses, where N corresponds to a number set in an RLG drive counter at Step 309. At this step "1" is set in the RLG drive counter, so that the stepping motor 44 is driven by one pulse, whereby the rear group lens 28 moves a distance corresponding to one pulse in the telephoto direction.

Figure 8:
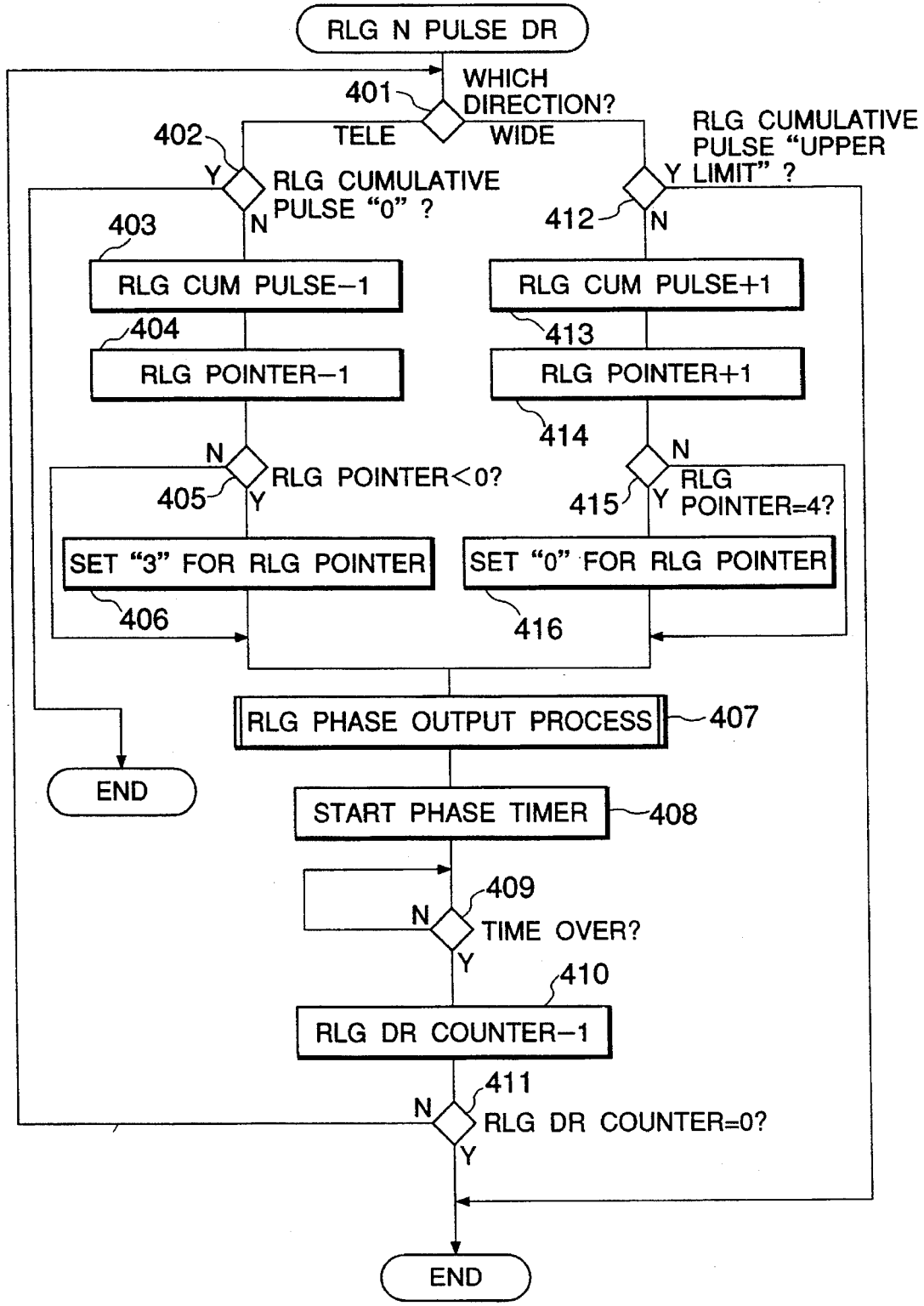
FIG. 8 is a flowchart to show an embodiment of RLG N pulse drive process executed by the lens driving motor control apparatus according to the present invention.

The details of the process at Step 310 are shown in the flowchart in FIG. 8. In this process, the flow first goes from Step 401 to Step 402, because the drive direction is set to the telephoto direction (TELE). Then, if a cumulative pulse number corresponding to the position of the rear lens group 28 is "0", which means that the rear lens group 28 is located at the reference position and closest to the front lens group 22, this process is ended under a decision that further movement is impossible in the telephoto direction.

On the other hand, if the RLG cumulative pulse number is at least "1", "1" is preliminarily subtracted from the RLG cumulative pulse number, because the rear lens group 28 will be moved forward by one pulse (Step 403). Then, "1" is subtracted from a value of RLG pointer corresponding to a current phase of stepping motor 44 (Step 404), and the stepping motor 44 will be driven to a next phase at below Step 407. In case the value of RLG pointer becomes negative, "3" is set as the value of RLG pointer (Steps 405 and 406).

When a pulse signal according to the value of RLG pointer is output at Step 407, the rotator 45 of stepping motor 44 is reversed as described above to move the rear lens group 28 in the telephoto direction. Then the flow waits before a certain time elapses (Steps 408 and 409), and then "1" is subtracted from the value of RLG drive counter (Step 410). As a result, the value of RLG drive counter becomes "0" and then this process is ended (Step 411).

As described, if the voltage of battery 50 is higher than the predetermined value, Steps 207 to 210 in FIG. 5A are repeated to simultaneously drive the stepping motor 44 pulse by pulse during continuous drive of DC motor 42, whereby the rear lens group 28 is intermittently fed in the telephoto direction.

On the other hand, a decision in the RLG drive process in FIG. 6 is that the voltage of battery 50 measured in the battery check (DC) process is not more than the predetermined value (Step 308), a simultaneous drive BCNG flag is set under a judgement that the voltage is insufficient for simultaneous drive (Step 311). After this flag is set, and then the flow goes into the RLG drive process, the flow goes from Step 306 directly to the position detection of the front lens group 22 (Step 208 in FIG. 5A), so that the stepping motor 44 is not driven and the rear lens group 28 is thus kept in a stationary state. Accordingly, only the front lens group 22 moves in the telephoto direction.

In this way, when the front lens group 22 reaches the TELE end or when the telephoto zoom switch (STELE) is turned off, a brake is applied to the DC motor 42 to stop the front lens group 22 at a desired position (Step 211). Then, after clearing the simultaneous drive BCNG flag and the DC motor drive flag (Steps 212 and 213), the position of the front lens group 22 is again detected (Step 214).

Subsequently, executed is a process for locating the rear lens group 28 at a standby position according to the current position of the front lens group 22. In the present embodiment, the standby position of the rear lens group 28 is a position where it is stepped back by a selected number of pulses from the INF position for far field shooting. Accordingly, after calculating an RLG cumulative pulse number corresponding to the standby position of the rear lens group 28 (Step 215), the stepping motor 44 is driven by the pulse number to locate the rear lens group 28 at the standby position (Step 216). After the telephoto zoom process is finished, the power supply to the phases of stepping motor 44 is stopped, so that the phase of stepping motor 44 at the standby position is kept in either state in FIG. 3A or FIG. 3C, i.e., at the static stable position.

Finally checking that the telephoto zoom switch (STELE) is off, the telephoto zoom process is ended.

As detailed above, the present invention employs such an arrangement that if the voltage of battery 50 is sufficiently high the DC motor 42 and the stepping motor 44 are simultaneously driven, whereas if the voltage of battery 50 is lowered down to a certain level low enough to cause a trouble in drive of stepping motor 44, only the DC motor 42 is first driven and the drive of stepping motor 44 is carried out after the DC motor 42 is stopped. Accordingly, even in the case where the simultaneous drive could cause step-out of stepping motor with a drive voltage of stepping motor 44 being not more than the predetermined value, the present invention can ensure the drive voltage of stepping motor 44 because the motors 42, 44 are separately driven, which can prevent a trouble such as a positional deviation of rear lens group 28.

The above embodiment was described as to the telephoto-side zoom operation, and a wide-angle-side zoom operation is also processed in the substantially same flow. Differences reside in that the drive direction is the wide-angle direction (WIDE) in which the lens groups approach the camera body, i.e., that the flow goes from Step 401 to Steps 412 to 416 in the flowchart in FIG. 8, and that the process is ended when the front lens group 22 reaches the WIDE end.

Also, the above embodiment is so arranged that if the voltage of battery 50 is low only the DC motor 42 is first driven and after the front group lens 22 is located at a desired position, the stepping motor 44 is then driven, but the same effect can be obtained by such an arrangement that the DC motor 42 and the stepping motor 44 are alternately driven. FIGS. 9A, 9B, 10, 11 and 12 show a procedure of telephoto zoom process employing such an alternate drive process.

Figure 9A:
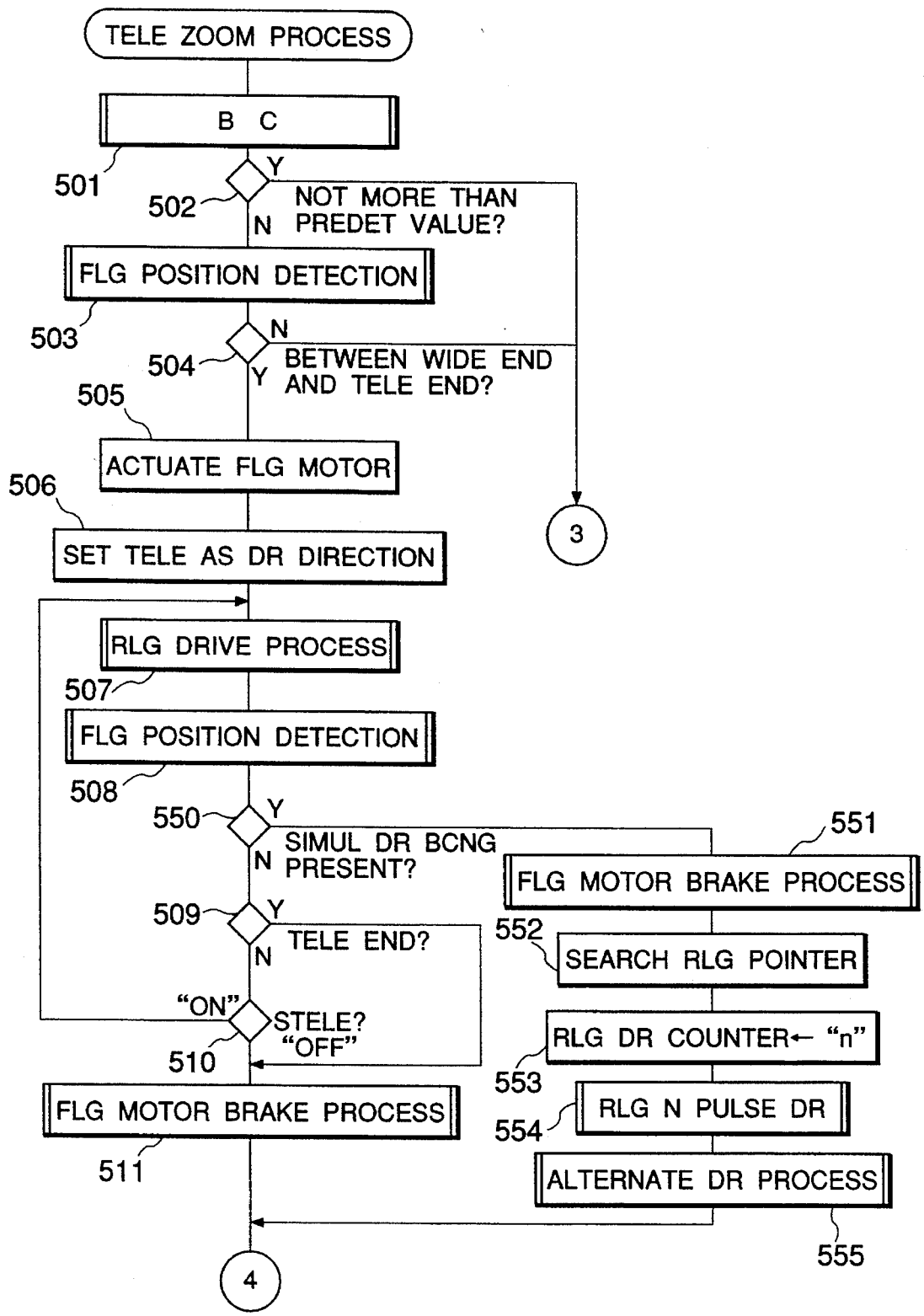
FIGS. 9A and 9B are flowcharts to show a second embodiment of telephoto zoom process executed by a lens driving motor control apparatus according to the present invention.
Figure 9B:
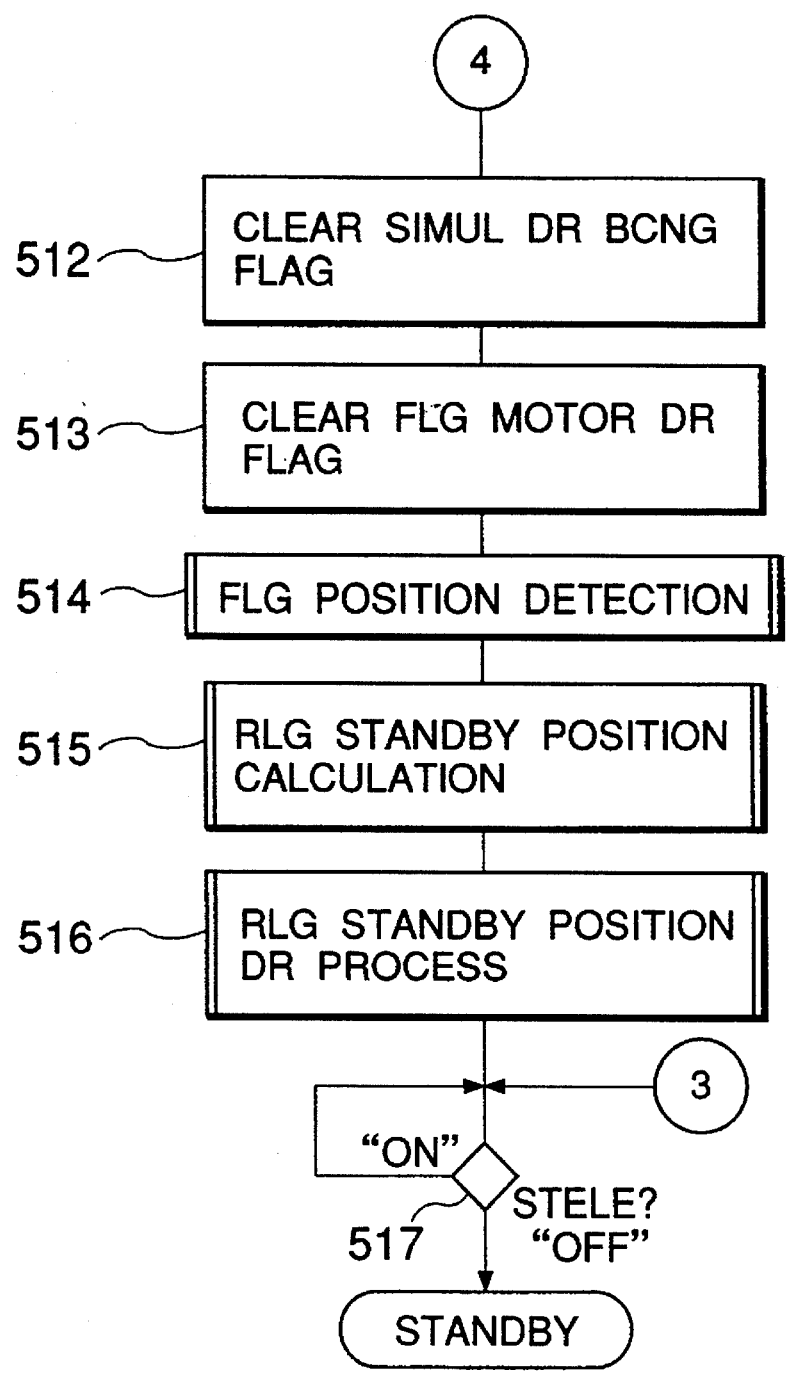

In the flowchart shown in FIGS. 9A and 9B, processing contents at Steps 501 to 517 are the same as Steps 201 to 217 in the flowchart of FIGS. 5A and 5B, and therefore the processes at Steps 501 to 517 are omitted to explain herein. The present embodiment is so arranged that if the voltage of battery 50 is lowered a simultaneous drive BCNG flag is set in an RLG drive process at Step 507 (see Step 311 in FIG. 6) and thereafter the flow goes into a process in which the DC motor 42 and the stepping motor 44 are alternately driven (Step 550).

First, a brake process is executed to stop the DC motor 42 in drive as a preparation before entering the alternate drive process at Step 555 (Step 551). Since the stepping motor 44 is stopped at the static stable position during execution of the alternate drive process, the stepping motor 44 is preliminarily set at the static stable position before the alternate drive process. For that reason, a value of RLG pointer at that time is searched at Step 552, and "1" or "2" is set in the RLG drive counter as to make the RLG pointer become a value corresponding to the static stable position (Step 553). Then the RLG N pulse drive process (see FIG. 8) is executed (Step 554). For example, in case of the energization pattern according to the above-described table, "0" is set in the RLG drive counter with "0" or "2" of RLG pointer, because the stepping motor 44 is at the static stable position. Also, in case the searched RLG pointer is odd, "1" is set in the RLG drive counter.

Figure 10:
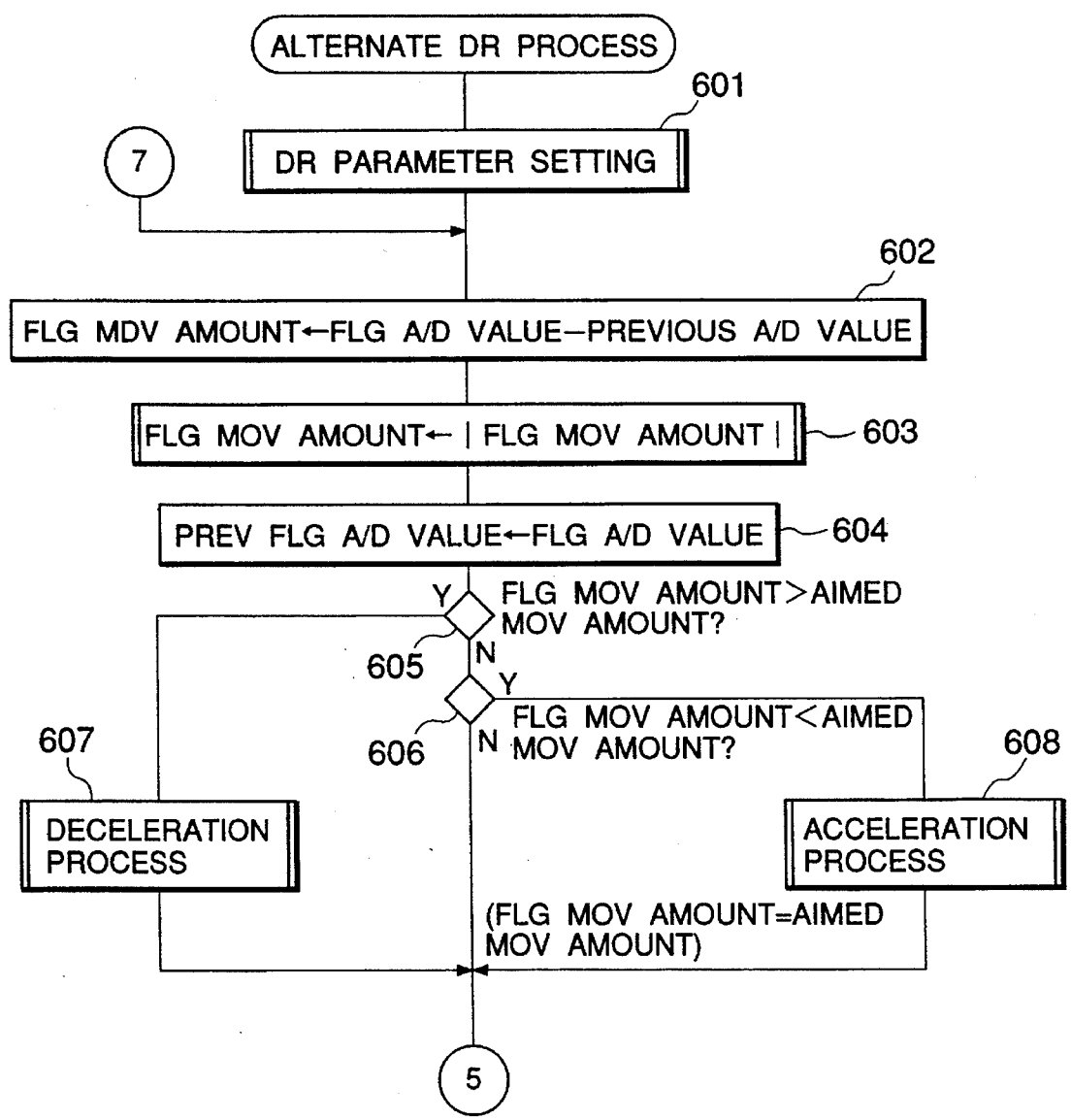
FIG. 10 is a flowchart to show an embodiment of alternate drive process in the telephoto zoom process in the second embodiment, showing a uniform velocity process of front lens group.
Figure 11:
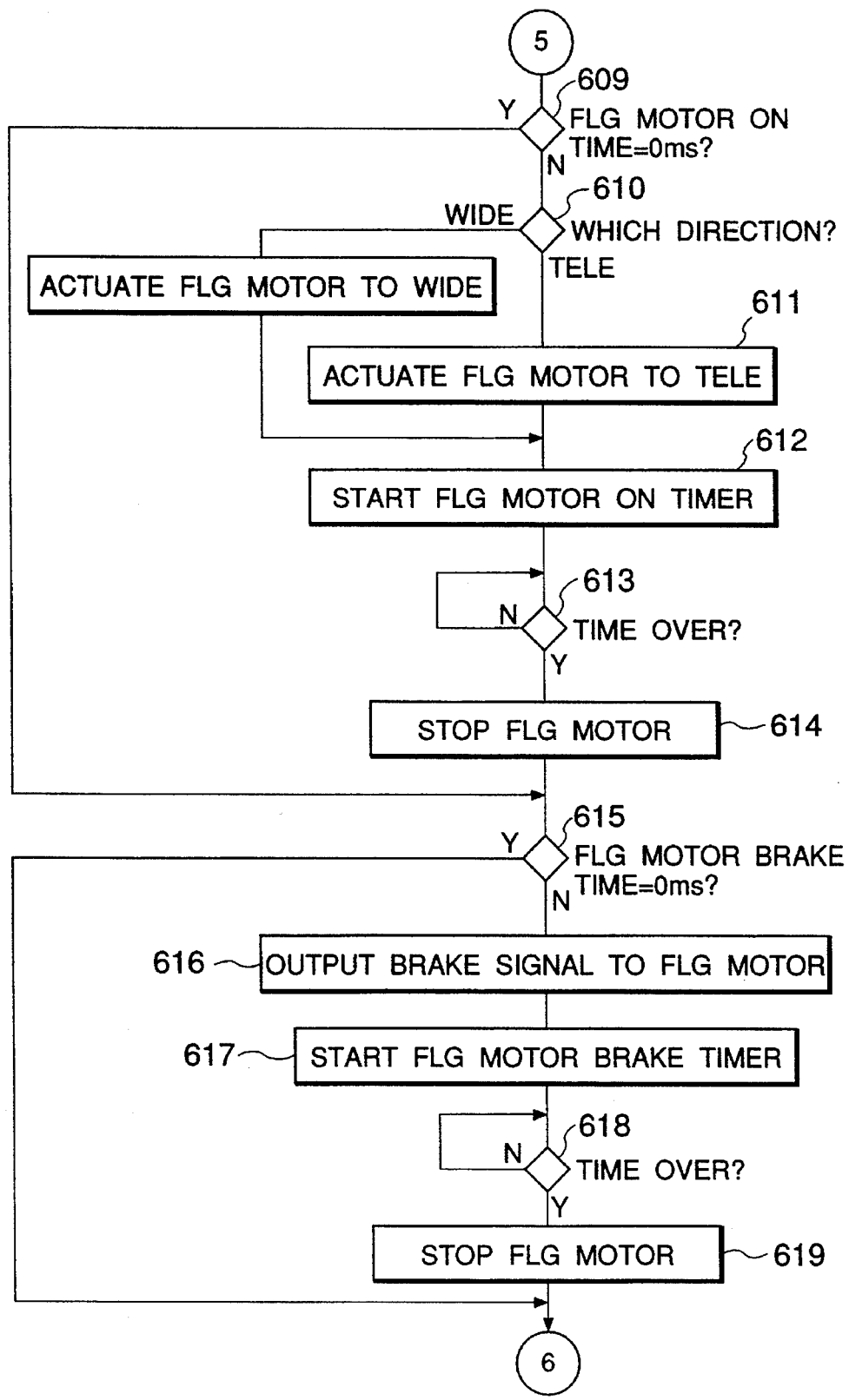
FIG. 11 is a flowchart to follow the process of FIG. 10 and to show a drive process of DC motor.
Figure 12:
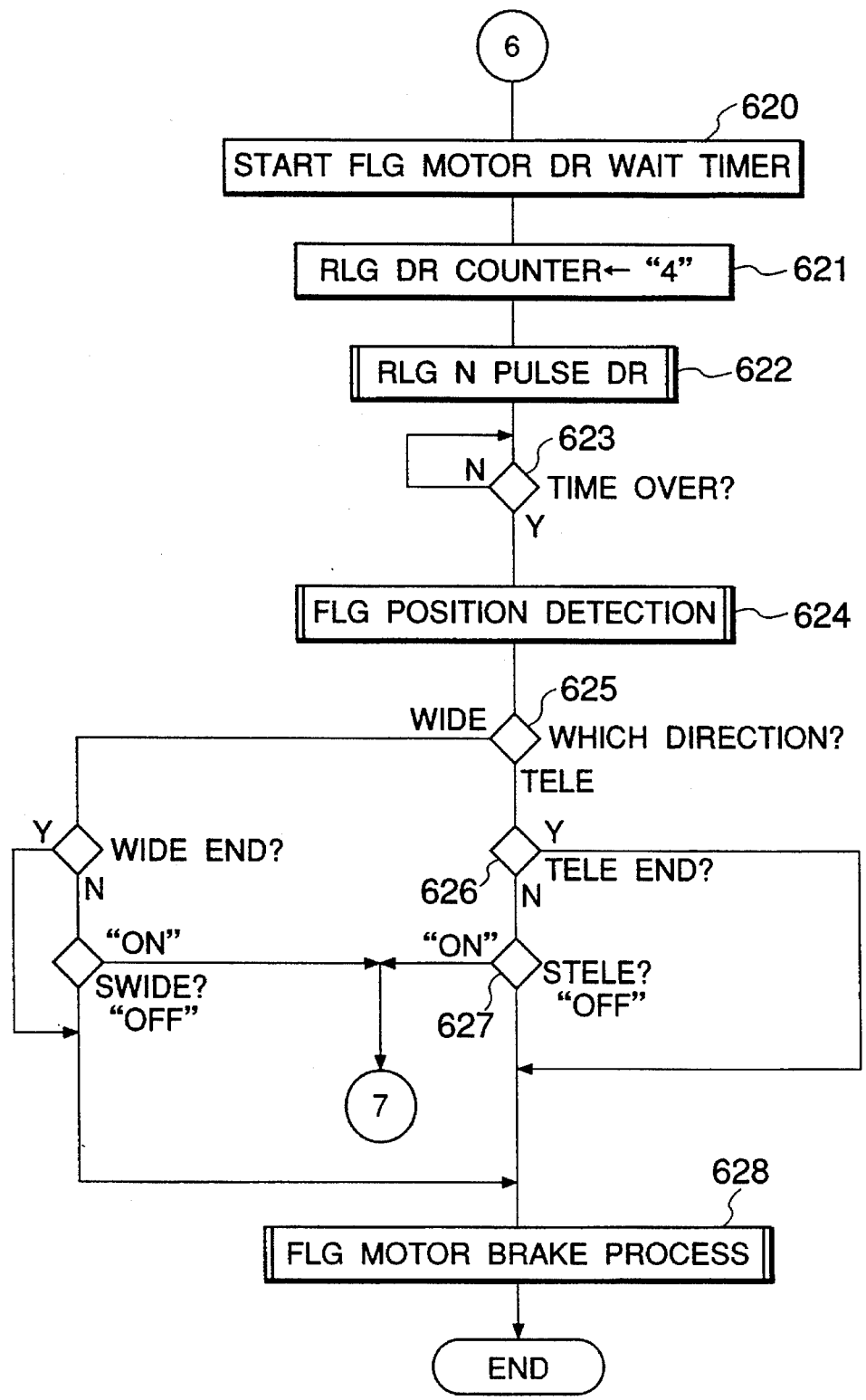
FIG. 12 is a flowchart to follow the process of FIG. 11 and to show a drive process of stepping motor.

After the above preparation is finished, the flow enters the alternate drive process (Step 555). This alternate drive process is as shown in FIG. 10 to FIG. 12. Initially set is drive parameters such as an initial value of power supply time to the DC motor 42 in the alternate drive process, an initial value of power supply stop time, and an initial value of brake time taken from brake start to stop (Step 601).

After that, a uniform velocity process is carried out for driving the front lens group 22 at a constant velocity. In this process, an amount of movement of FLG 22 moved by a single drive operation of DC motor 42 is first obtained from a signal from the position sensor 24 for detecting the position of the front lens group 22 (Step 602). In this embodiment, the position sensor 24 is a potentiometer, a signal from which is an analog signal. An A/D value converted from an analog signal into a digital signal is supplied as position information of the front lens group 22 to CPU 40. Therefore, an amount of movement of the front lens group 22 can be expressed as a difference between a current A/D value and a previous A/D value, which is an A/D value indicating the previous position of the front lens group 22 before the drive of DC motor. Since there is no previous A/D value upon first drive of DC motor 42, a value preliminarily set at Step 601 as one of the drive parameters is used.

Since the movement amount of the front lens group 22 obtained by the subtraction of A/D values can take a negative value, an absolute value of the movement amount replaces the movement amount at Step 603. At next Step 604, the data used as the current A/D value in the above process is set as a previous A/D value.

Then, an actual movement amount obtained at Steps 602 and 603 is compared with an aimed movement amount of the front lens group 22 set as the drive parameter (Steps 605 and 606). If the former is greater, a deceleration process is executed (Step 607). In this deceleration process, the power supply time and brake time of DC motor 42 are changed and set such that the movement amount of the front lens group 22 becomes the aimed movement amount. In case the actual movement amount is smaller than the aimed movement amount, an acceleration process is executed (Step 608).

Then, the flow goes to the process as shown in FIG. 11. If the set power supply time and brake time both are "0", the flow goes to the drive process of stepping motor 44 without driving the DC motor 42 (Steps 609 and 615). In cases except for it, the DC motor 42 is driven for the set power supply time to move the front lens group 22 in the telephoto direction (Steps 610 to 614). Then, a brake signal is output to the DC motor 42 to stop the front lens group 22 at a desired position, and the power supply to the DC motor 42 is stopped after the set brake time elapses (Steps 616 to 619).

Subsequently, the flow proceeds to a stepping motor drive process shown in FIG. 12. In this process, an FLG motor drive WAIT timer is first started to keep the DC motor 42 in a stationary state for a certain time (Step 620). Then "4" is set in the RLG drive counter (Step 621) and the stepping motor 44 is driven by four pulses to move the rear lens group 28 in the telephoto direction (Step 622). The process at Step 622 is the process shown in FIG. 8, but Steps 401 to 411 are repeated four times in this case. Since the stepping motor 44 is kept at the static stable position before drive, it will reach the static stable position after the drive of four pulses, which can prevent step-out of stepping motor 44 during next drive of DC motor 42.

When a certain time elapses after start of the DC motor drive WAIT timer (Step 623), position detection of the front lens group 22 is carried out for a next drive process of DC motor 42 (Step 624).

The drive process of DC motor 42 (Steps 602 to 619) and the drive process of stepping motor 44 (Steps 620 to 624) are alternately repeated before the front lens group 22 reaches the TELE end or before the telephoto zoom switch (STELE) is turned off (Steps 625 to 627). Finally, a brake process of DC motor 42 is carried out to surely stop the front lens group 22 (Step 628) and the alternate drive process is finished.

The above description concerned the telephoto-side zoom operation. A substantially same process as the telephoto-side zooming process can be executed in case of the wide-angle-side zooming operation except that the driving direction is set as the wide-angle direction (WIDE) and that the terminal position is the WIDE end.

This second embodiment is characterized in that if the voltage of battery 50 is lowered the DC motor 42 and the stepping motor 44 are alternately driven, while having such a common feature to the first embodiment that the DC motor 42 and the stepping motor 44 are not driven at the same time, thereby obtaining the same effect.

As detailed above, the lens driving motor control apparatus according to the present invention is such arranged that if the drive voltage is sufficiently high, the FLG driving and RLG driving motors 42 and 44 are simultaneously driven, but if the drive voltage is lowered, the motors are separately driven. Such separate drive of motors 42 and 44 permits each motor to be driven in a normal state even with a low voltage which could cause an error operation of motor when simultaneously driven. Specifically, in case of the DC motor 42 being used as the FLG driving motor and the stepping motor 44 as the RLG driving motor, the step-out of stepping motor 44 can be prevented and a trouble such as a positional deviation of rear lens group 28 can be prevented.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

What is claimed is:

1. A camera comprising:

a camera body;

a front lens group arranged as movable backward and forward relative to said camera body;

a rear lens group disposed between said camera body and said front lens group as movable backward and forward relative to said camera body;

a front lens group driving motor for driving said front lens group;

a rear lens group driving motor for driving said rear lens group;

a zoom switch; and a motor control apparatus for controlling said front lens group driving motor and said rear lens group driving motor, wherein when said zoom switch is on, if a voltage of a power source for driving said front lens group driving motor and said rear lens group driving motor is more than a predetermined value said motor control apparatus simultaneously drives said front lens group driving motor and said rear lens group driving motor, whereas if the voltage is not more than said predetermined value said motor control apparatus drives only said front lens group driving motor and thereafter drives only said rear lens group driving motor.

2. A camera according to claim 1, wherein said front lens group driving motor is a direct current motor and said rear lens group driving motor is a stepping motor.

3. A camera according to claim 1, wherein said motor control apparatus includes:

voltage measuring means for measuring a voltage of a power source for driving said front lens group driving motor and said rear lens group driving motor;

decision means for deciding as to whether the voltage is more than said predetermined value;

first motor controlling means for controlling said front lens group driving motor and said rear lens group driving motor, said first motor controlling means having means for simultaneously driving said front lens group driving motor and said rear lens group driving motor, if a decision is made that the voltage is more than said predetermined value; and second motor controlling means for controlling said front lens group driving motor and said rear lens group driving motor, said second motor controlling means having means for driving only said front lens group driving motor and thereafter driving only said rear lens group driving motor, if the voltage is not more than said predetermined value.

4. A camera according to claim 3, wherein said first motor controlling means has means for stopping said front lens group driving motor, when said zoom switch is turned off.

5. A camera according to claim 4, wherein said motor control apparatus includes position sensing means for sensing a position of said front lens group, and means for obtaining a standby position of said rear lens group according to the current position of said front lens group on the basis of a position information from said position sensing means, and wherein said first motor controlling means has means for driving only said rear lens group driving motor to locate said rear lens group at the obtained standby position after said front lens group driving motor is stopped.

6. A camera according to claim 5, wherein said position sensing means is a potentiometer.

7. A camera according to claim 2, wherein said motor control apparatus includes position sensing means for sensing a position of said front lens group, and means for deciding as to whether said front lens group is in a telephoto end in which said front lens group is the most apart from said camera body in a photographable state or in a wide-angle end in which said front lens group is the closest to said camera body in the photographable state, and wherein said first motor controlling means has means for stopping said front lens group driving motor if a decision is made that said front lens group is in said telephoto end or said wide-angle end.

8. A camera according to claim 7, wherein said motor control apparatus includes means for obtaining a standby position of said rear lens group according to the current position of said front lens group on the basis of a position information from said position sensing means, and wherein said first motor controlling means has means for driving only said rear lens group driving motor to locate said rear lens group at the obtained standby position after said front lens group driving motor is stopped.

9. A camera according to claim 7, wherein said position sensing means is a potentiometer.

10. A camera according to claim 3, wherein said second motor controlling means has means for stopping said front lens group driving motor, when said zoom switch is turned off.

11. A camera according to claim 8, wherein said motor control apparatus includes position sensing means for sensing a position of said front lens group, and means for obtaining a standby position of said rear lens group according to the current position of said front lens group on the basis of a position information from said position sensing means, and wherein said second motor controlling means has means for driving only said rear lens group driving motor to locate said rear lens group at the obtained standby position after said front lens group driving motor is stopped.

12. A camera according to claim 9, wherein said position sensing means is a potentiometer.

13. A camera according to claim 3, wherein said motor control apparatus includes position sensing means for sensing a position of said front lens group, and means for deciding as to whether said front lens group is in a telephoto end in which said front lens group is the most apart from said camera body in a photographable state or in a wide-angle end in which said front lens group is the closest to said camera body in the photographable state, and wherein said second motor controlling means has means for stopping said front lens group driving motor if a decision is made that said front lens group is in said telephoto end or said wide-angle end.

14. A camera according to claim 13, wherein said motor control apparatus includes means for obtaining a standby position of said rear lens group according to the current position of said front lens group on the basis of a position information from said position sensing means, and wherein said second motor controlling means has means for driving only said rear lens group driving motor to locate said rear lens group at the obtained standby position after said front lens group driving motor is stopped.

15. A camera according to claim 13, wherein said position sensing means is a potentiometer.

16. A camera lens driving motor control apparatus for use in a camera having a camera body, a front lens group arranged as movable backward and forward relative to said camera body, a rear lens group disposed between said camera body and said front lens group as movable backward and forward relative to said camera body, a front lens group driving motor for driving said front lens group, a rear lens group driving motor for driving said rear lens group, and a zoom switch, comprising:

voltage measuring means for measuring a voltage of a power source for driving said front lens group driving motor and said rear lens group driving motor;

decision means for deciding as to whether the voltage is more than said predetermined value;

first motor controlling means for controlling said front lens group driving motor and said rear lens group driving motor, said first motor controlling means having means for simultaneously driving said front lens group driving motor and said rear lens group driving motor if a decision is made that the voltage is more than said predetermined value; and second motor controlling means for controlling said front lens group driving motor and said rear lens group driving motor, said second motor controlling means having means for driving only said front lens group driving motor and thereafter driving only said rear lens group driving motor if the voltage is not more than said predetermined value.

17. A camera lens driving motor control apparatus according to claim 16, wherein said first motor controlling means has means for stopping said front lens group driving motor when said zoom switch is turned off.

18. A camera lens driving motor control apparatus according to claim 17, comprising position sensing means for sensing a position of said front lens group, and means for obtaining a standby position of said rear lens group according to the current position of said front lens group on the basis of a position information from said position sensing means, wherein said first motor controlling means has means for driving only said rear lens group driving motor to locate said rear lens group at the obtained standby position after said front lens group driving motor is stopped.

19. A camera lens driving motor control apparatus according to claim 18, wherein said position sensing means is a potentiometer.

20. A camera lens driving motor control apparatus according to claim 16, comprising position sensing means for sensing a position of said front lens group, and means for deciding as to whether said front lens group is in a telephoto end in which said front lens group is the most apart from said camera body in a photographable state or in a wide-angle end in which said front lens group is the closest to said camera body in the photographable state, wherein said first motor controlling means has means for stopping said front lens group driving motor if a decision is made that said front lens group is in said telephoto end or said wide-angle end.

21. A camera lens driving motor control apparatus according to claim 20, comprising means for obtaining a standby position of said rear lens group according to the current position of said front lens group on the basis of a position information from said position sensing means, wherein said first motor controlling means has means for driving only said rear lens group driving motor to locate said rear lens group at the obtained standby position after said front lens group driving motor is stopped.

22. A camera lens driving motor control apparatus according to claim 20, wherein said position sensing means is a potentiometer.

23. A camera lens driving motor control apparatus according to claim 16, wherein said second motor controlling means has means for stopping said front lens group driving motor, when said zoom switch is turned off.

24. A camera lens driving motor control apparatus according to claim 23, comprising position sensing means for sensing a position of said front lens group, and means for obtaining a standby position of said rear lens group according to the current position of said front lens group on the basis of a position information from said position sensing means, wherein said second motor controlling means has means for driving only said rear lens group driving motor to locate said rear lens group at the obtained standby position after said front lens group driving motor is stopped.

25. A camera lens driving motor control apparatus according to claim 24, wherein said position sensing means is a potentiometer.

26. A camera lens driving motor control apparatus according to claim 16, comprising position sensing means for sensing a position of said front lens group, and means for deciding as to whether said front lens group is in a telephoto end in which said front lens group is the most apart from said camera body in a photographable state or in a wide-angle end in which said front lens group is the closest to said camera body in the photographable state, wherein said second motor controlling means has means for stopping said front lens group driving motor if a decision is made that said front lens group is in said telephoto end or said wide-angle end.

27. A camera lens driving motor control apparatus according to claim 26, comprising means for obtaining a standby position of said rear lens group according to the current position of said front lens group on the basis of a position information from said position sensing means, wherein said second motor controlling means has means for driving only said rear lens group driving motor to locate said rear lens group at the obtained standby position after said front lens group driving motor is stopped.

28. A camera lens driving motor control apparatus according to claim 26, wherein said position sensing means is a potentiometer.

29. A camera lens driving motor control method for use in a camera having a camera body, a front lens group arranged as movable backward and forward relative to said camera body, a rear lens group disposed between said camera body and said front lens group as movable backward and forward relative to said camera body, a front lens group driving motor for driving said front lens group, a rear lens group driving motor for driving said rear lens group, and a zoom switch, comprising the steps of:

measuring a voltage of a power source for driving said front lens group driving motor and said rear lens group driving motor;

deciding as to whether the measured voltage is more than said predetermined value;

simultaneously driving said front lens group driving motor and said rear lens group driving motor, if a decision is made that the measured voltage is more than said predetermined value; and driving only said front lens group driving motor and thereafter driving only said rear lens group driving motor, if the measured voltage is not more than said predetermined value.

30. A camera comprising:

a camera body;

a front lens group arranged as movable backward and forward relative to said camera body;

a rear lens group disposed between said camera body and said front lens group as movable backward and forward relative to said camera body;

a front lens group driving motor for driving said front lens group;

a rear lens group driving motor for driving said rear lens group;

a zoom switch; and a motor control apparatus for controlling said front lens group driving motor and said rear lens group driving motor, wherein when said zoom switch is on, if a voltage of a power source for driving said front lens group driving motor and said rear lens group driving motor is more than a predetermined value said motor control apparatus simultaneously drives said front lens group driving motor and said rear lens group driving motor, whereas if the voltage is not more than said predetermined value said motor control apparatus alternately drives said front lens group driving motor and said rear lens group driving motor by respective predetermined amounts.

31. A camera according to claim 30, wherein said motor control apparatus includes:

voltage measuring means for measuring a voltage of a power source for driving said front lens group driving motor and said rear lens group driving motor;

decision means for deciding as to whether the voltage is more than said predetermined value;

first motor controlling means for controlling said front lens group driving motor and said rear lens group driving motor, said first motor controlling means having means for simultaneously driving said front lens group driving motor and said rear lens group driving motor, if a decision is made that the voltage is more than said predetermined value; and second motor controlling means for controlling said front lens group driving motor and said rear lens group driving motor, said second motor controlling means having means for alternately driving said front lens group driving motor and said rear lens group driving motor by respective predetermined amounts, if the voltage is not more than said predetermined value.

32. A camera according to claim 31, wherein said first motor controlling means has means for stopping said front lens group driving motor, when said zoom switch is turned off.

33. A camera according to claim 32, wherein said motor control apparatus includes position sensing means for sensing a position of said front lens group, and means for obtaining a standby position of said rear lens group according to the current position of said front lens group on the basis of a position information from said position sensing means, and wherein said first motor controlling means has means for driving only said rear lens group driving motor to locate said rear lens group at the obtained standby position after said front lens group driving motor is stopped.

34. A camera according to claim 33, wherein said position sensing means is a potentiometer.

35. A camera according to claim 31, wherein said motor control apparatus includes position sensing means for sensing a position of said front lens group, and means for deciding as to whether said front lens group is in a telephoto end in which said front lens group is the most apart from said camera body in a photographable state or in a wide-angle end in which said front lens group is the closest to said camera body in the photographable state, and wherein said first motor controlling means has means for stopping said front lens group driving motor if a decision is made that said front lens group is in said telephoto end or said wide-angle end.

36. A camera according to claim 35, wherein said motor control apparatus includes means for obtaining a standby position of said rear lens group according to the current position of said front lens group on the basis of a position information from said position sensing means, and wherein said first motor controlling means has means for driving only said rear lens group driving motor to locate said rear lens group at the obtained standby position after said front lens group driving motor is stopped.

37. A camera according to claim 35, wherein said position sensing means is a potentiometer.

38. A camera according to claim 31, wherein said second motor controlling means has means for stopping said front lens group driving motor, when said zoom switch is turned off.

39. A camera according to claim 38, wherein said motor control apparatus includes position sensing means for sensing a position of said front lens group, and means for obtaining a standby position of said rear lens group according to the current position of said front lens group on the basis of a position information from said position sensing means, and wherein said second motor controlling means has means for driving only said rear lens group driving motor to locate said rear lens group at the obtained standby position after said front lens group driving motor is stopped.

40. A camera according to claim 39, wherein said position sensing means is a potentiometer.

41. A camera according to claim 31, wherein said motor control apparatus includes position sensing means for sensing a position of said front lens group, and means for deciding as to whether said front lens group is in a telephoto end in which said front lens group is the most apart from said camera body in a photographable state or in a wide-angle end in which said front lens group is the closest to said camera body in the photographable state, and wherein said second motor controlling means has means for stopping said front lens group driving motor if a decision is made that said front lens group is in said telephoto end or said wide-angle end.

42. A camera according to claim 41, wherein said motor control apparatus includes means for obtaining a standby position of said rear lens group according to the current position of said front lens group on the basis of a position information from said position sensing means, and wherein said second motor controlling means has means for driving only said rear lens group driving motor to locate said rear lens group at the obtained standby position after said front lens group driving motor is stopped.

43. A camera according to claim 41, wherein said position sensing means is a potentiometer.

44. A camera according to claim 30, wherein said front lens group driving motor is a direct current motor and said rear lens group driving motor is a stepping motor.

45. A camera lens driving motor control apparatus for use in a camera having a camera body, a front lens group arranged as movable backward and forward relative to said camera body, a rear lens group disposed between said camera body and said front lens group as movable backward and forward relative to said camera body, a front lens group driving motor for driving said front lens group, a rear lens group driving motor for driving said rear lens group, and a zoom switch, comprising:

voltage measuring means for measuring a voltage of a power source for driving said front lens group driving motor and said rear lens group driving motor;

decision means for deciding as to whether the voltage is more than said predetermined value;

first motor controlling means for controlling said front lens group driving motor and said rear lens group driving motor, said first motor controlling means having means for simultaneously driving said front lens group driving motor and said rear lens group driving motor, if a decision is made that the voltage is more than said predetermined value; and second motor controlling means for controlling said front lens group driving motor and said rear lens group driving motor, said second motor controlling means having means for alternately driving said front lens group driving motor and said rear lens group driving motor by respective predetermined amounts, if the voltage is not more than said predetermined value.

46. A camera lens driving motor control apparatus according to claim 45, wherein said first motor controlling means has means for stopping said front lens group driving motor when said zoom switch is turned off.

47. A camera lens driving motor control apparatus according to claim 46, comprising position sensing means for sensing a position of said front lens group, and means for obtaining a standby position of said rear lens group according to the current position of said front lens group on the basis of a position information from said position sensing means, wherein said first motor controlling means has means for driving only said rear lens group driving motor to locate said rear lens group at the obtained standby position after said front lens group driving motor is stopped.

48. A camera lens driving motor control apparatus according to claim 47, wherein said position sensing means is a potentiometer.

49. A camera lens driving motor control apparatus according to claim 45, comprising position sensing means for sensing a position of said front lens group, and means for deciding as to whether said front lens group is in a telephoto end in which said front lens group is the most apart from said camera body in a photographable state or in a wide-angle end in which said front lens group is the closest to said camera body in the photographable state, wherein said first motor controlling means has means for stopping said front lens group driving motor if a decision is made that said front lens group is in said telephoto end or said wide-angle end.

50. A camera lens driving motor control apparatus according to claim 49, comprising means for obtaining a standby position of said rear lens group according to the current position of said front lens group on the basis of a position information from said position sensing means, wherein said first motor controlling means has means for driving only said rear lens group driving motor to locate said rear lens group at the obtained standby position after said front lens group driving motor is stopped.

51. A camera lens driving motor control apparatus according to claim 49, wherein said position sensing means is a potentiometer.

52. A camera lens driving motor control apparatus according to claim 45, wherein said second motor controlling means has means for stopping said front lens group driving motor, when said zoom switch is turned off.

53. A camera lens driving motor control apparatus according to claim 52, comprising position sensing means for sensing a position of said front lens group, and means for obtaining a standby position of said rear lens group according to the current position of said front lens group on the basis of a position information from said position sensing means, wherein said second motor controlling means has means for driving only said rear lens group driving motor to locate said rear lens group at the obtained standby position after said front lens group driving motor is stopped.

54. A camera lens driving motor control apparatus according to claim 53, wherein said position sensing means is a potentiometer.

55. A camera lens driving motor control apparatus according to claim 45, comprising position sensing means for sensing a position of said front lens group, and means for deciding as to whether said front lens group is in a telephoto end in which said front lens group is the most apart from said camera body in a photographable state or in a wide-angle end in which said front lens group is the closest to said camera body in the photographable state, wherein said second motor controlling means has means for stopping said front lens group driving motor if a decision is made that said front lens group is in said telephoto end or said wide-angle end.

56. A camera lens driving motor control apparatus according to claim 55, comprising means for obtaining a standby position of said rear lens group according to the current position of said front lens group on the basis of a position information from said position sensing means, wherein said second motor controlling means has means for driving only said rear lens group driving motor to locate said rear lens group at the obtained standby position after said front lens group driving motor is stopped.

57. A camera lens driving motor control apparatus according to claim 55, wherein said position sensing means is a potentiometer.

58. A camera lens driving motor control method for use in a camera having a camera body, a front lens group arranged as movable backward and forward relative to said camera body, a rear lens group disposed between said camera body and said front lens group as movable backward and forward relative to said camera body, a front lens group driving motor for driving said front lens group, a rear lens group driving motor for driving said rear lens group, and a zoom switch, comprising the steps of:

measuring a voltage of a power source for driving said front lens group driving motor and said rear lens group driving motor;

deciding as to whether the measured voltage is more than said predetermined value;

simultaneously driving said front lens group driving motor and said rear lens group driving motor, if a decision is made that the measured voltage is more than said predetermined value; and alternately driving said front lens group driving motor and said rear lens group driving motor by respective predetermined amounts, if the measured voltage is not more than said predetermined value.

* * * * *